(12) United States Patent
Kubota et al.

(10) Patent No.: US 6,961,997 B2
(45) Date of Patent: Nov. 8, 2005

(54) FRACTURE SPLIT METHOD FOR CONNECTING ROD

(75) Inventors: Tsuyoshi Kubota, Iwata (JP); Shinya Iwasaki, Iwata (JP); Tsuneo Isobe, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 118 days.

(21) Appl. No.: 10/622,100

(22) Filed: Jul. 16, 2003

(65) Prior Publication Data

US 2004/0025340 A1 Feb. 12, 2004

(30) Foreign Application Priority Data

Jul. 16, 2002 (JP) .................................. 2002-206522

(51) Int. Cl.$^7$ .......................... B21D 53/84; B23P 17/00
(52) U.S. Cl. ............... 29/888.09; 29/888.08; 29/413
(58) Field of Search ............... 29/888.09, 888.08, 29/888.092, 525.11, 525.2, 413, 526.2; 225/2

(56) References Cited

U.S. PATENT DOCUMENTS

| | | |
|---|---|---|
| 1,498,748 A | 6/1924 | Pierce |
| 2,553,935 A | 5/1951 | Parks et al. |
| 3,285,098 A | 11/1966 | Beveridge |
| 3,818,577 A | 6/1974 | Balley et al. |
| 3,994,054 A | 11/1976 | Cuddon-Fletcher et al. |
| 4,860,419 A | 8/1989 | Hekman |
| 5,568,891 A | 10/1996 | Hoag et al. |
| 5,882,438 A | 3/1999 | Luchner et al. |

FOREIGN PATENT DOCUMENTS

JP      58-037310      3/1983

OTHER PUBLICATIONS

Davis, J.R., *Metals Handbook*, Desk Edition, Second Edition, 1998, "Case Hardening of Steel", pp. 982–995.

*Primary Examiner*—John C. Hong
(74) *Attorney, Agent, or Firm*—Keating & Bennett LLP

(57) ABSTRACT

A connecting rod is formed using a method that includes providing a connecting rod blank. The connecting rod blank has a rod section disposed between a big end and a small end. The big end has a first hole generally sized to receive a crankpin of a crankshaft and at least one second hole generally sized to receive a bolt, wherein the axes of the first and second holes are generally normal to each other. The big end of the connecting rod has a dividing plane that extends through both the first and second holes. The connecting rod blank is processed by hardening at least the big end to a sufficient depth such that a first region of the big end lying between the first and second holes at the dividing plane is hardened, while leaving a substantial second region of the big end at the dividing plane generally unhardened. The connecting rod blank is further processed by splitting the big end along the dividing plane to produce a rod part fracture surface and a cap part fracture surface.

22 Claims, 15 Drawing Sheets

Double fractures

FRACTURE SPLIT METHOD FOR CONNECTING ROD

PRIORITY INFORMATION

This application is based on and claims priority under 35 U.S.C. § 119 to Japanese Patent Application No. 2002-206522 filed on Jul. 16, 2002, the entire contents of which is hereby expressly incorporated by reference herein.

BACKGROUND OF THE INVENTION

1. Field of the Invention

The present invention is directed to a method of forming a fracture split in a part, and more specifically, to a method of forming a fracture split in the big end of a connecting rod. The present invention is also directed to a connecting rod having a fracture surface at the big end having both hardened and unhardened portions.

2. Description of the Related Art

Connecting rods are typically attached to the crankshaft of an engine by fabricating the big end of the connecting rod can be separated with a cap part that is separable from the rod part. Typically, the finished cap part and rod part were fabricated separately and then bolted together around a crankshaft pin during assembly. In order to reduce fabrication cost, the cap and rod parts are first forged as a single piece and then broken along a fracture line to form the two individual parts. In some instances, this technique is used to produce fracture surfaces on the rod and cap parts that are uneven. When properly engineered, the uneven fracture surfaces allow the rod and cap parts to maintain a precise, repeatable alignment relative to each other. This alignment is generally critical since it influences the circularity of the resulting crankpin hole when the rod and cap parts are attached together. The uneven fracture surfaces also help to maintain the alignment during use by inhibiting lateral movement between the rod and cap parts. Obtaining and maintaining alignment and circularity of the crankpin hole is important for reducing wear and power loss during engine use.

Various problems can occur during the process of splitting the connecting rod into the rod and cap parts. For instance, when the connecting rod is hardened for better performance, the high loading force necessary to break the big end into the rod and cap parts can deform the big end and decrease the degree of circularity of the surfaces forming the crankpin hole. Also, if a high carbon material is used that is heat treated by quenching, the fracture split surfaces will be in the form of a grain boundary surface that is generally flat, making it difficult to obtain accurate alignment between the rod and cap parts. One method that is used to reduce this problem, which is disclosed in a laid-open Japanese patent publication Sho 58-37310, is to incorporate a plurality of separation assist holes in a zigzag pattern in the area where the big end of the connecting rod is to be split, thereby making the resulting fracture split surfaces macroscopically irregular. However, this approach usually requires that the assist holes be accurate positioned, which increases production cost.

Another problem that can occur during the splitting process is the production of double fractures that result when fracture initiation occurs at more than one point along the break plane. Such double fractures can cause tiny fractions of the fracture split surfaces to come off, mix into engine oil, and damage other components of the engine. Special jigs have been developed for reducing the occurrence of double fractures by concentrating the fracture splitting force to a point on the inside surface of the big end, thus providing a single location for fracture initiation. When this method is used, the jig generally has a complicated shape and requires a high degree of accuracy, which can again increase production costs.

In view of these problems, a method of forming a connecting rod is needed that is relatively inexpensive, but which maintains the circularity of the surfaces forming the crankpin hole and provides fracture split surfaces that are free of double fractures and are sufficiently rough for accurate and repeatable alignment between the rod and cap parts.

SUMMARY OF THE INVENTION

One aspect of the present invention involves a method of forming a connecting rod that comprises providing a connecting rod blank. The connecting rod blank has a rod section disposed between a big end and a small end. The big end has a first hole generally sized to receive a crankpin of a crankshaft (e.g., generally has the same size diameter as the crankpin) and at least a second hole generally sized to receive a bolt. The axes of the first and second holes are generally normal to each other. The big end of the connecting rod also has a dividing plane that extends through both the first and second holes. The method further comprises hardening at least the big end to a sufficient depth such that at least a first region of the big end lying between the first and second holes at the dividing plane is hardened, while a substantial second region of the big end at the dividing plane is left generally unhardened. The method also comprises controlling at least a process hardening parameter so as to produce a hardened surface layer of a predetermined depth that is greater than one half of a smallest wall thickness between the walls of the first hole and the second hole. The method also comprises splitting the big end along the dividing plane to produce a rod part fracture surface and a cap part fracture surface. In certain embodiments, controlling involves controlling temperature and exposure time.

Another aspect of the present invention involves a method of forming a connecting rod that comprises providing a connecting rod blank. The connecting rod blank has a rod section disposed between a big end and a small end. The big end has a first hole generally sized to receive a crankpin of a crankshaft and at least a second hole generally sized to receive a bolt. The axes of the first and second holes are generally normal to each other. The big end of the connecting rod also has a dividing plane that extends through both the first and second holes. The method further comprises hardening at least the big end to a sufficient depth such that at least a first region of the big end lying between the first and second holes at the dividing plane is hardened, while a substantial second region of the big end at the dividing plane is left generally unhardened. The method also comprises splitting the big end along the dividing plane to produce a rod part fracture surface and a cap part fracture surface.

In certain embodiments, hardening comprises case hardening followed by tempering. In another embodiment, hardening comprises case hardening followed by tempering without applying a carbon preventing treatment to the big end. In yet another embodiment, hardening involves producing a higher carbon content in the first region than in the second region. Hardening may involve controlling at least a process hardening parameter so as to produce a hardened surface layer of a predetermined depth that is greater than one half of a smallest wall thickness between the walls of the first hole and the second hole. For instance, controlling temperature and exposure time may be used to produce a hardened surface layer of a predetermined depth that is greater than one half of a smallest wall thickness between the walls of the first hole and the second hole. In another aspect of the invention, splitting produces rod part fracture surfaces and cap part fracture surfaces, wherein each fracture surface comprises a grain boundary fracture surface and an elongation boundary fracture surface.

Another aspect of the present invention involves a method of forming a connecting rod that comprises providing a connecting rod blank. The connecting rod blank has a rod section disposed between a big end and a small end. The big end has a first hole generally sized to receive a crankpin of a crankshaft and at least a second hole generally sized to receive a bolt. The axes of the first and second holes are generally normal to each other. The big end of the connecting rod also has a dividing plane that extends through both the first and second holes. The method further comprises hardening at least the big end to a sufficient depth such that at least a first region of the big end lying between the first hole and an outside end surface of the big end at the dividing plane is hardened, while a substantial second region of the big end at the dividing plane is left generally unhardened. The method also comprises splitting the big end along the dividing plane to produce a rod part fracture surface and a cap part fracture surface.

Yet another aspect of the present invention involves a method of forming a connecting rod that comprises providing a connecting rod blank. The connecting rod blank has a rod section disposed between a big end and a small end. The big end has a first hole generally sized to receive a crankpin of a crankshaft and at least a second hole generally sized to receive a bolt. The axes of the first and second holes are generally normal to each other. The big end of the connecting rod also has a dividing plane that extends through both the first and second holes. The big end additionally has a tab of a predetermined thickness disposed along the dividing plane. The method further comprises hardening at least the big end to a sufficient depth such that at least the tab is hardened while leaving a substantial portion of the big end at the dividing plane generally unhardened. The method also comprises splitting the big end along the dividing plane to produce a rod part fracture surface and a cap part fracture surface.

Still another aspect of the present invention involves a method of forming a connecting rod that comprises providing a connecting rod blank. The connecting rod blank has a rod section disposed between a big end and a small end. The big end has a first hole generally sized to receive a crankpin of a crankshaft and at least a second hole generally sized to receive a bolt. The axes of the first and second holes are generally normal to each other. The big end of the connecting rod also has a dividing plane that extends through both the first and second holes. The method further comprises hardening at least the big end to a sufficient depth such that at least a first region of the big end lying between the first and second holes at the dividing plane is hardened, while a substantial second region of the big end at the dividing plane is left generally unhardened. The method also comprises splitting the big end along the dividing plane to produce a rod part fracture surface and a cap part fracture surface.

Another aspect of the present invention involves a method of forming a connecting rod that comprises providing a connecting rod blank having a rod section disposed between a big end and a small end, wherein the big end has a dividing plane that generally bisects the big end. The method further comprises hardening at least the big end to a predetermined depth and splitting the big end along the dividing plane to produce a grain boundary fracture surface and an elongation fracture surface. The predetermined depth of hardening is selected so as to produce a ratio of the elongate fracture surface area to the sum of the elongate fracture surface area and the grain boundary fracture surface area that is between about 0.3 and about 0.7. The ratio may also be between about 0.4 and about 0.6 or simply about 0.5.

Another aspect of the invention involves a method of forming a connecting rod that comprises providing a connecting rod blank. The connecting rod blank has a rod section disposed between a big end and a small end. The big end has a first hole generally sized to receive a crankpin of a crankshaft and at least a second hole generally sized to receive a bolt. The axes of the first and second holes are generally normal to each other. The big end of the connecting rod also has a dividing plane that extends through both the first and second holes. The method also comprises hardening at least the big end to a sufficient depth such that along the dividing plane a first section of the big end is hardened and a second section of the big end is generally unhardened. The method further comprises applying a separating force generally along the dividing plane such that the resulting stress produced in the vicinity of the first section is higher that the resulting stress produced in the vicinity of the second section. The method also comprises splitting the big end along the dividing plane to produce a rod part fracture surface and a cap part fracture surface.

In accordance with a further aspect of the invention, a connecting rod is provided that comprises a small end, a big end including a rod part and a cap part separable from the rod part, and a rod connecting the rod part of the big end to the small end. The rod and cap parts have mating faces including an outer perimeter and a void. The mating faces also include a first surface comprising material that is hardened and a second surface comprising material that is generally unhardened. The mating faces also include a section between the outer surface and the void comprising hardened material.

In certain embodiments, the first surface comprises a grain boundary fracture surface and the second surface comprises an elongation fracture surface. The ratio of the elongate fracture surface area to the sum of the elongate fracture surface area and the grain boundary fracture surface area may between about 0.3 and about 0.7. The ratio may also be between about 0.4 and about 0.6 or simply about 0.5.

In accordance with yet another aspect of the invention, a connecting rod comprises a small end, a big end including a rod part and a cap part separable from the rod part, and a rod connecting the rod part of the big end to the small end. The rod and cap parts have mating faces. The connecting rod further comprises a tab a with predetermined thickness intersecting the dividing plane, the tab comprising only hardened material. Each of the mating faces includes a first surface comprising material that is hardened and a second surface comprising material that is generally unhardened. The first surface includes the portion of the tab intersecting the dividing plane.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise 15 figures.

DETAILED DESCRIPTION OF THE PREFERRED EMBODIMENTS OF THE INVENTION

Figure 1:
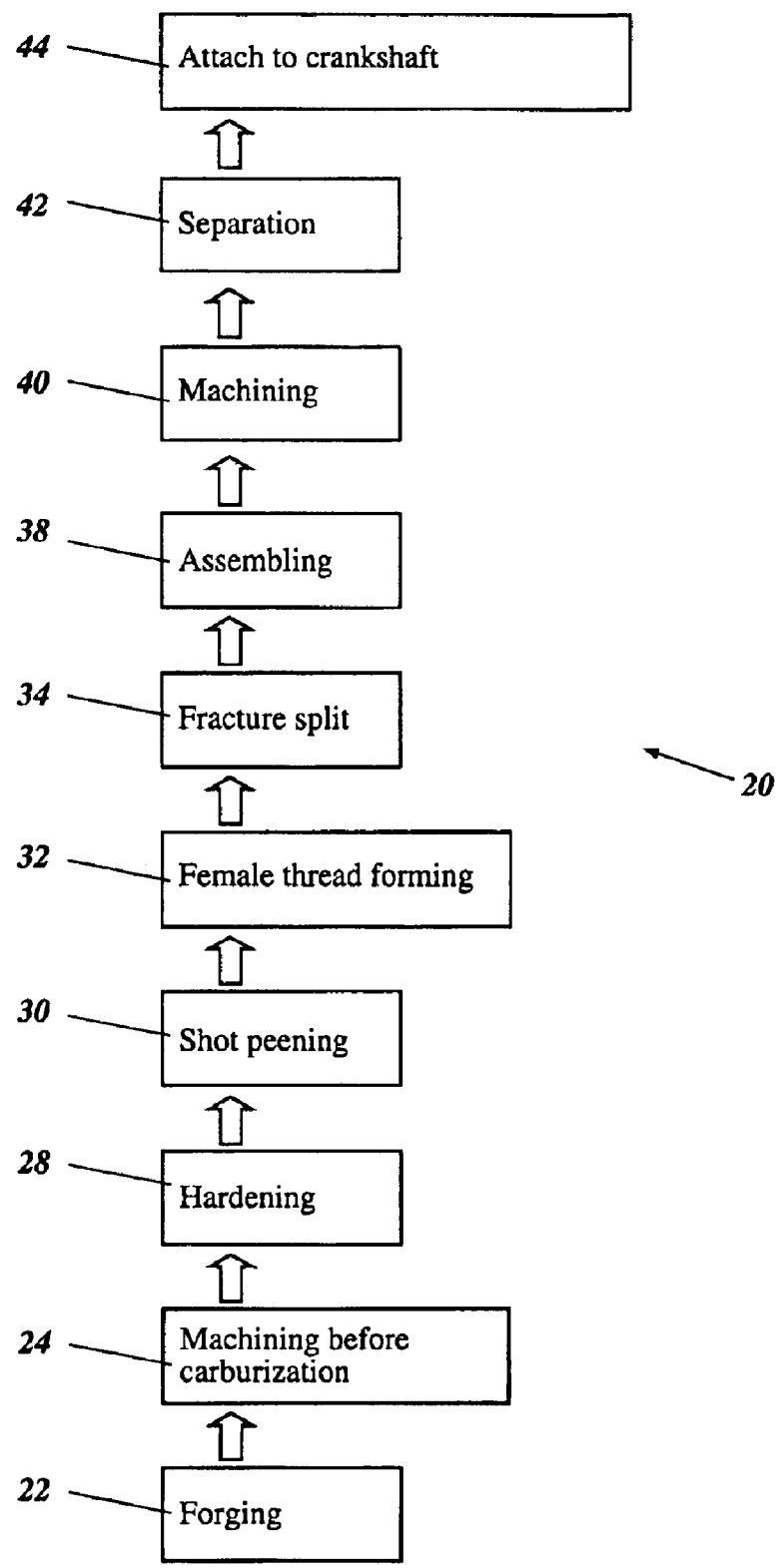
FIG. 1 is a block diagram illustrating a manufacturing method for producing a connecting rod in accordance with a preferred to embodiment of the present invention.

The manufacturing process can be used to produce a hardened component of an engine, such as, for example, a connecting rod. FIG. 1 illustrates the preferred manufacturing steps involved in producing a connecting rod in accordance with a preferred manufacturing method 20; however, various aspects and features of the invention can be readily adapted to produce various types of components for other products. Accordingly, the illustrated manufacturing method is not meant to limit the invention, but rather to disclose one embodiment that various aspects and features of the invention can take.

By way of an initial overview, the method 20 can start by providing a connecting rod blank. The connecting rod blank preferably is created by forging the connecting rod (Step 22) and then machining the connecting rod (Step 24). The method 20 also comprises one or more surface processing steps, such as, for example, surface hardening the connecting rod (Step 28) and shot peening the surfaces of the connecting rod (Step 30). In the illustrated embodiment, internal threads are formed (e.g., tapped) within one or more holes previously formed in the connecting rod (Step 32). The connecting rod also is fracture split into a rod part and a cap part (Step 34). After the rod and cap parts are formed, the method 20 comprises assembling the rod and cap parts (Step 38) and then further machining the connecting rod (Step 40). Once fabrication of the connecting rod has been completed, the rod and cap parts are separated (Step 42) and then attaching together about a crankpin of an engine crankshaft (Step 44). With this overview in mind, each of these manufacturing steps will now be described in greater detail.

Figure 2:
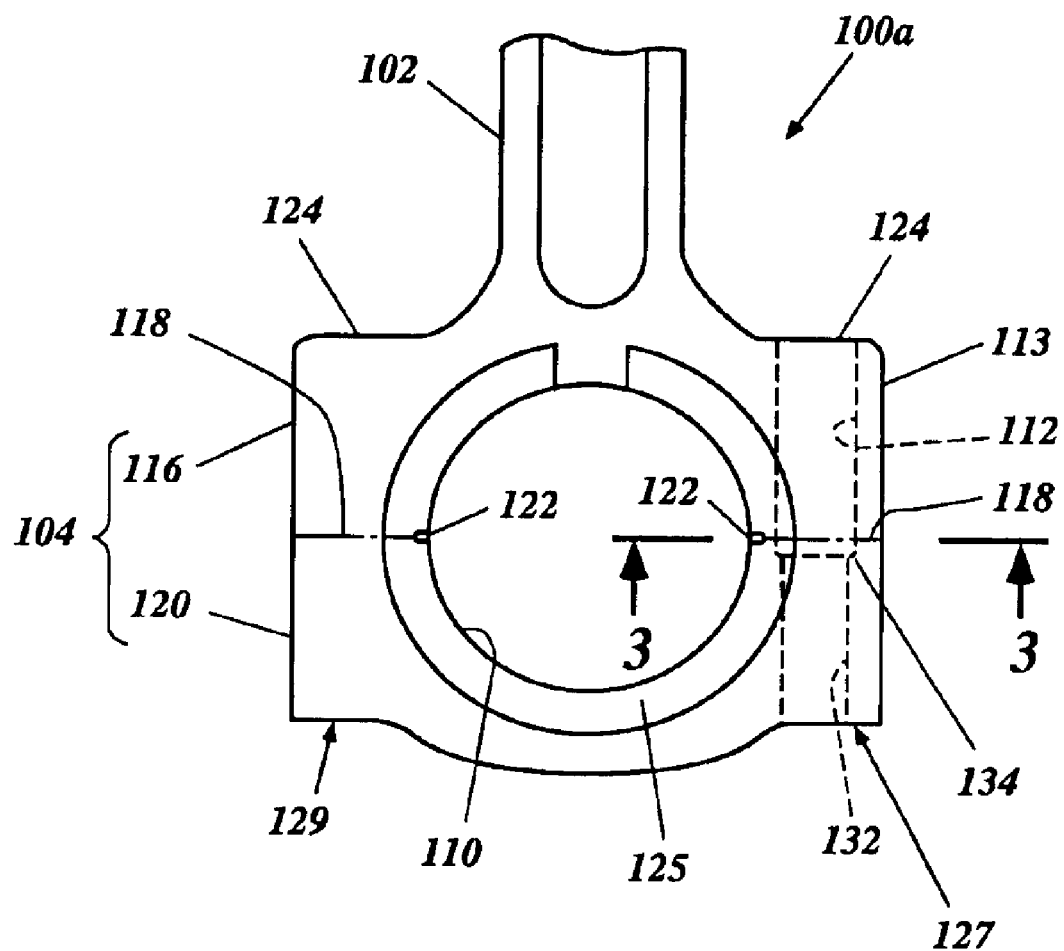
FIG. 2 is a front view of the big end a forged connecting rod prior to fracture splitting into a rod part and a cap part.
Figure 5:
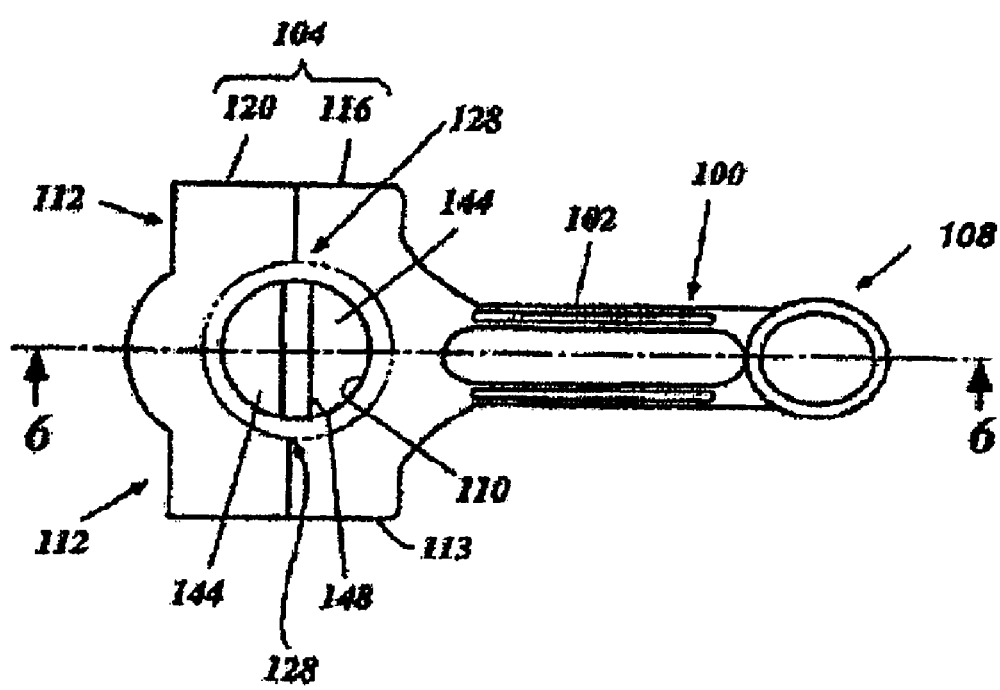
FIG. 5 is a drawing for illustrating a process of fracture splitting the big end of a connecting rod in accordance with the preferred manufacturing method.

As best shown in FIG. 2, Steps 22 and 24 of the method 20 are used to provide a connecting rod blank 100a including a rod 102 disposed between a big end 104 and a small end 108 (see FIG. 5). The connecting rod blank 100a may also be formed using other methods such as, for example, but without limitation, casting followed by machining. The connecting rod blank 100a preferably comprises a hardenable metal such as steel. In certain embodiments, the connecting rod blank 100a comprises carbon steel or case hardening steel. The small end 108 includes a hole that is sized, after its final machining, to receive a piston pin of an engine. The small end 108 is integrally formed with and disposed at one end of the rod 102. The big end 104 preferably is also integrally formed the rod 102, but is disposed at the other end of the rod 102.

The big end 104 includes a crankpin hole 110 that at the blank stage is generally sized to receive a crankpin of a crankshaft (not shown). The crankpin hole 110 has an axis that extends generally perpendicular to a longitudinal axis of the rod 102. The big end 104 also includes one or more bolt holes. In the illustrated embodiment, which involves a conventional construction of a connection rod, the big end includes two bolt holes 112 that are located on diametrically opposed sides of the crankpin hole 110. Each bolt hole 112 has an axis that lies generally perpendicular to the axis of the crankpin hole 110 and generally parallel to the longitudinal axis of the rod 102. Each bolt hole 112 also is generally sized to receive a bolt, at the blank stage.

The big end 104 further includes an outer surface 113 that generally includes any surface of the big end 104 that is not the wall of the bolt holes 112 or the wall of the crankpin hole 110 (e.g., any outward facing surface of the big end 104)). A dividing plan 118, along which the big end will be split in Step 34, divides the big end 104 Into a rod part 116 disposed on one side of the dividing plane 118 and a cap part 120 disposed on the other side of the dividing plane 118. The dividing plane 118 extends through both the crankpin and bolt holes 110, 112, and in the illustrated embodiment, the dividing plane contains the axis of the crankpin hole 110. Accordingly, at the blank stage, the rod part 116 and the cap part 120 are initially formed as a single piece and the crankpin hole 110 is preferably disposed at least near, if not at the center of the big end 104.

In the illustrated process, the bolt holes 112 are machined at Step 24, before hardening the connecting rod blank 100a, along with the fracture starting grooves 122 and the shoulder parts 124. Generally smooth bearing surfaces 125 are also machined at this stage on the sides of the big end 104 about the crankpin hole 110. Several of these surfaces can be machines further and possible polished at subsequent stages of the manufacturing process (e.g., at Step 40). Additionally, the bolt holes 112, the starting grooves 122, and the shoulder parts 124 may alternatively be formed using other methods common in the art.

The fracture starting grooves 122 are disposed along the wail of the crankpin hole 110 and lie generally in or are generally centered about the dividing plane 118. The fracture starting grooves 122 aid in forming a stress riser during fracture splitting of the rod and cap parts 116, 120 (Step 34).

As seen in FIG. 2, the shoulder parts 124 extend from the rod 102. The shoulder parts 124 are respectively bored with the bolt holes 112. Each bolt hole 112 preferably includes a first section suitably sized to be tapped with internal threads and a second section that has a larger diameter size to receive freely the bolt that will be used to join together the rod and cap parts 116, 120. The first section of each hole 112 lies entirely to one side of the dividing plane 118.

In the illustrated process, the connecting rod blank 100a undergoes a surface hardening treatment after its general shape has been formed in Steps 22 and 24. At least the big end 104 of the connecting rod preferably is case hardened. In the illustrated embodiment, the hardening step (Step 28) involves carburizing, quenching and tempering the connecting rod blank 100a, without applying a carbon preventing treatment to at least the surface area of big end 104 proximate to the dividing plane 118. In some applications, however, only a certain section or sections of connecting rod blank 100s (e.g., the big end 104) is subjected to a surface hardening treatment. For example, some sections of the connecting rod blank 100a are treated with a carbon preventative prior be carburization. Additionally, other suitable hardening processes common in the art (e.g., involving nitriding or carbonnitriding) can be used to form the hardened surface layer of at least the big end of the connecting rod.

In gas carburization, carbon is dissolved into the steel surface of a low-carbon steel using a furnace within an elevated temperature range (e.g., from about 1500° F. to about 1700° F.) in a controlled atmosphere (e.g., within a gaseous atmosphere comprising CO, $N_2$, $H_2$, $CO_2$, $H_2O$, and $CH_4$). The rate of change in case depth at a given furnace temperature is proportional to the square root of the exposure time. For example, a furnace time of about 2 to 3 hours at a furnace temperature of 1700° F. is often required to obtain a penetration depth of 1 mm. Longer furnace time produce greater penetration depth. Through this process, carbon is dissolved in the surface layers to render the steel austenitic. The steel thus is hardened in such a manner that the surface layer, known as the case, at each hardened surface of the connecting rod becomes substantially harder than the remaining material, known as the core. After obtaining a desired case depth (which will be described in greater detail below) the connecting rod blank 100a is then quenched using a media such as water, a brine solution, or an oil. Finally, the part is tempered to form a martensitic microstructure.

The carburization process forms a peripheral surface around the big end 104 (a hardened surface layer or case 126) that has a higher carbon content than that of the original, unhardened, base metal (the core). The hardened surface layer 126 is high in brittleness and can produce a flat grain boundary fracture surfaces when subsequently fracture split. By contrast, the interior portion 130 of the big end 104, which is surrounded by the hardened surface layer 126, remains a generally unhardened base metal, with little or no change in its chemical composition or mechanical properties due to the surface hardening treatment. The interior portion 130 is, therefore, less brittle compared to the hardened surface layer 126 and exhibits a microscopic elongation fracture surface when subsequently fracture split.

The depth T of the hardened surface layer 126 is the perpendicular distance from the surface to the deepest point at which at which a specific hardness is maintained. In the illustrated embodiment, the hardness critreion preferably is about 52 HRC.

Figure 3:
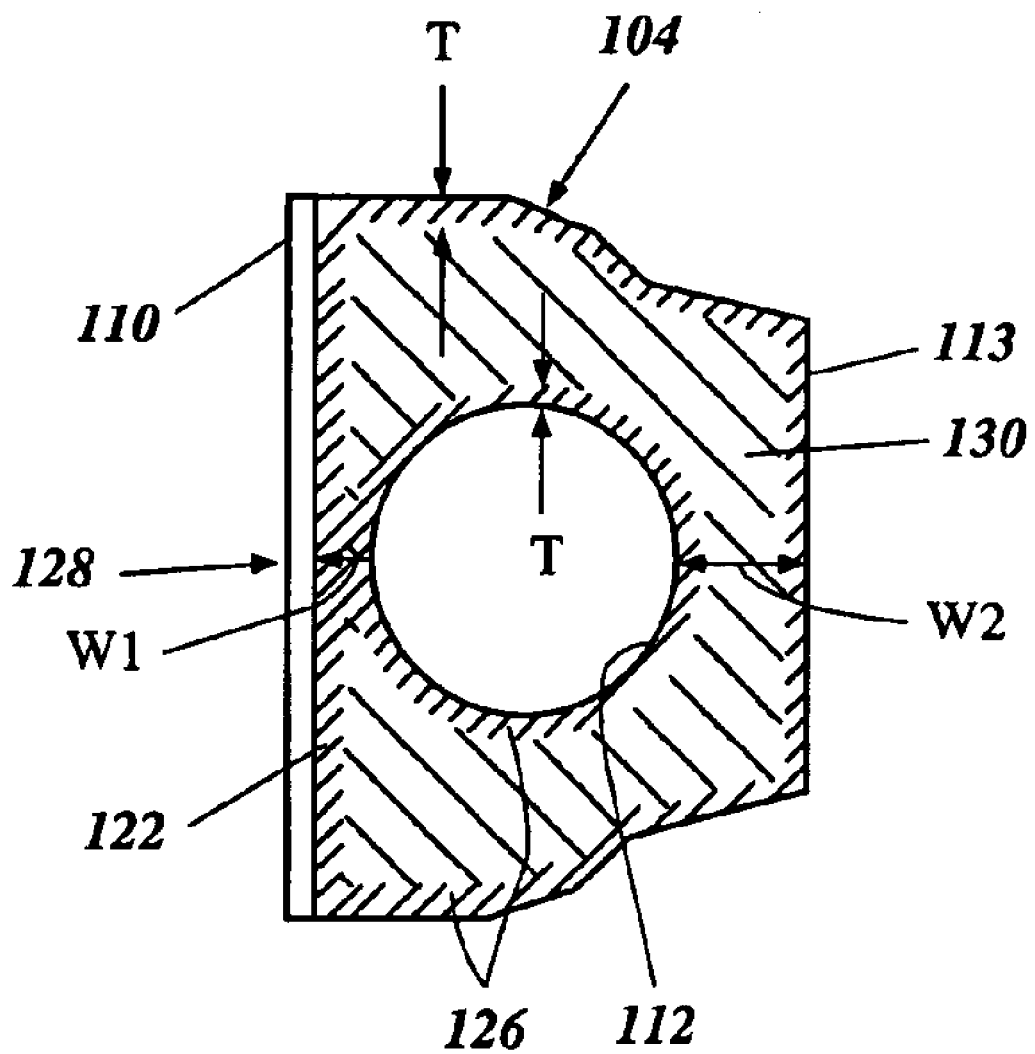
FIG. 3 is a cross-sectional view taken along line 3—3 of FIG. 2 showing hardened and generally unhardened regions or sections of the big end of the connecting rod.

FIG. 3 illustrates a cross section taken through one side section 127 of the big end 104 of the connecting rod that lies to one side of the crankpin hole 110 after the hardening step (Step 28). The plan along which the cross section is taken coincides with the dividing plane 118. While the following description of the hardened part is described in reference to this big end side section 127, the description should be understood to apply equally to the big end side section 129 that lies on the opposite side of the crankpin hole 110.

As understood from FIG. 3, the hardening process forms a hardened surface layer 126 on the surfaces of the connecting rod blank 100a. The depth T of the hardened surface layer 126 is sufficient to harden at least all of the material along the dividing plane 118 that lies in between the crankpin and bolt holes 110, 112, i.e., region 128. The depth T, however, is selected to leave a substantial portion of connecting rod blank 100a long the dividing plane 118 generally unhardened. The hardening process preferably forms a hardened surface layer 126 that has a generally uniform depth T.

The region 128 along the dividing plane 118 between the holes 110, 112 forms a relatively thin wall between the holes 110, 112 having a wall thickness W1. This wall thickness W1 preferably is by a smallest wall thickness of the big end 104, at least along the dividing plane 118. For example, in the illustrated embodiment, thickness W2 represents generally the next smallest wall thickness about the bolt hole 112 and spaced from the region 128. In the illustrated embodiment, the thickness W2 is measured between the bolt hole 112 and the outside wall 113 of the shoulder part 124. The wall thickness W1 at the region 128 is smaller than the wall thickness W2 disposed outside the region 128. The wall thickness W2 preferably is designed to withstand the loads produced during use of the connecting rod 100 due to the combustion pressure of the engine. In this way, dimensions in the shoulder parts 124 of the big end 104 can be reduced so as to reduce the weight of the connecting rod 100.

The smallest wall thickness W1 is less than twice the depth (2×T) of the hardened surface layer 126 and, preferably, the wall thickness W2 is greater than twice the hardened depth T of the hardened surface layer 126. For example, but without limitation, the thickness T of the hardened surface layer 126 can be between about 0.8 mm and about 1.0 mm and the hardened surface layer 126 is formed on all the surfaces of the crankpin hole 110 and the bolt holes 112, as well as the outside surface 113 of the big end 104. The thickness T may fall outside the range of about 0.8 mm and about 1.0 mm, depending on various design parameters such as the method of hardening, the thickness of the W1, and engine performance requirements. The thickness T of the hardened surface layer 126, however, is sufficiently large such that the all the material within the region 128 between crankpin and bolt holes 110, 112 is hardened.

The method 20 further comprises the step 30 of shot peening the surfaces of the connecting rod 100. Shot peening provides various benefits including increased resistance to fatigue, stress corrosion, and wear. The method 20 also involves the step 32 of machining threads into the first sections 132 of the bolt holes 112. The second sections 134 of the bolt holes can be further machined at this step to be larger than the root diameters of the thread holes 132.

Figure 4:
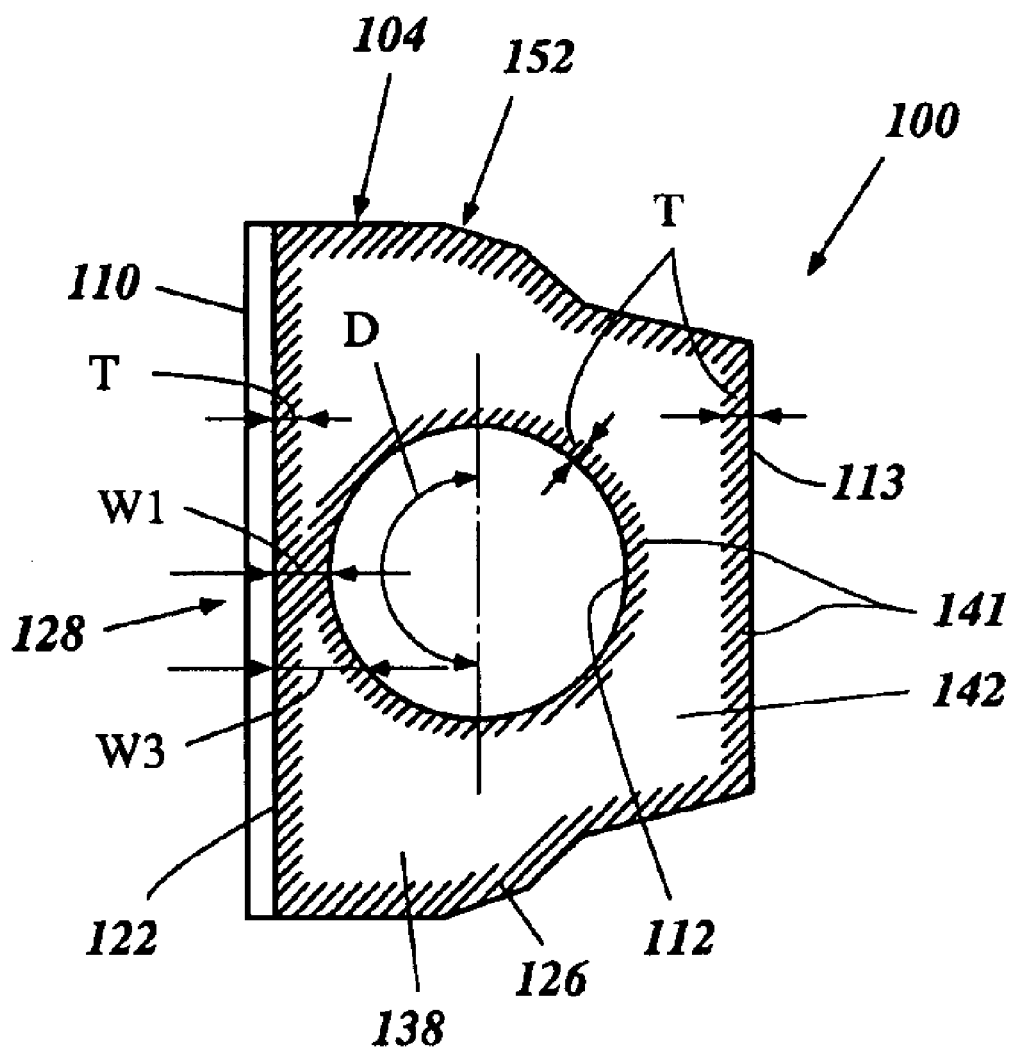
FIG. 4 is a top view of a fracture surface produced in accordance with the preferred manufacturing method.

With reference to FIG. 4, the big end 104 undergoes fracture splitting after hardening to split the big end 104 along the dividing plane 118. This process produces a rod part fracture surface 138 on the rod part 116 and a cap part fracture surface 140 (see FIG. 13) on the cap part 120. Each of the fracture surfaces 138, 140 comprises a hardened surface 141 and an unhardened surface 142. The hardened surface 142 comprises material that was hardened as a result of the surface hardening treatment, while the unhardened surface 143 comprises material that is generally unhardened and, therefore, generally unaffected by the surface hardening treatment.

In the preferred embodiment, the smallest wall thickness W1 within the region 128 is set to be thinner than twice the depth T of the hardened surface layer 126, as noted above. By so setting this relationship between the smallest wall thickness W1 and the depth T, the material within the portion 128 is made harder than material with the interior portion 130, which is substantially unhardened.

As seen in FIG. 4, the wall thickness W3 of a portion of the big end 104, which lies between the bolt hole 112 and the crankpin hole 110 (i.e., within the 180 degree range D on the crankpin side of the bolt hole 112), is set to be greater than twice the depth T of the hardened surface layer 126 on the fracture split surfaces 138, 140, except for in region 128. In other words, some of the material between the crankpin hole 110 and the bolt hole 112 remains generally unhardened except in region 128.

Figure 6:
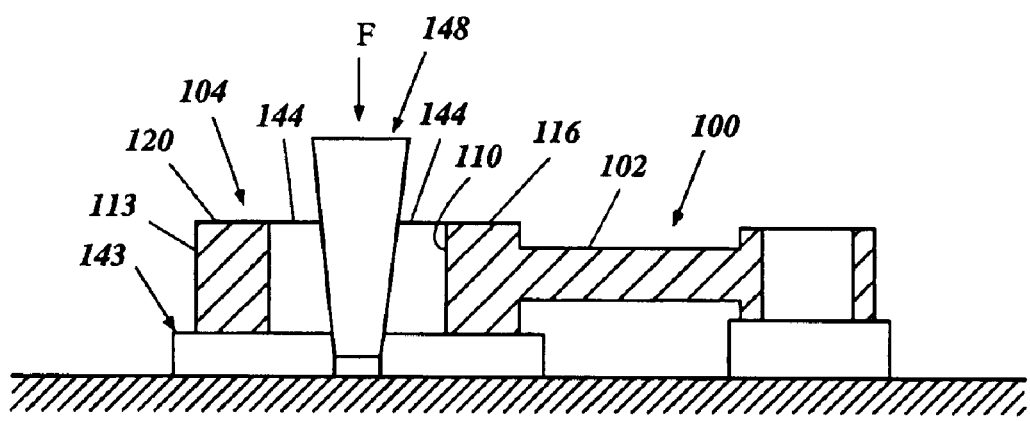
FIG. 6 is a cross-sectional view taken along line 6—6 of FIG. 5.
Figure 8:
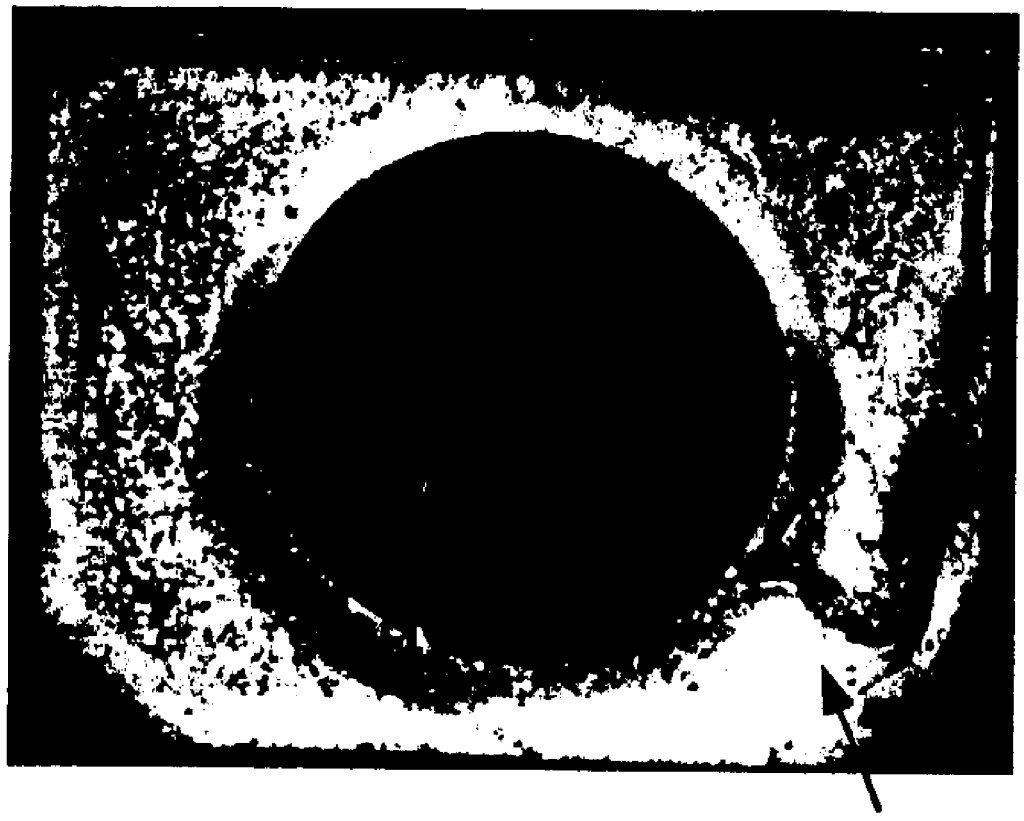
FIG. 8 is a picture of a fracture split surface of a connecting rod made using a conventional method.

An exemplifying procedure for fracture splitting the big end 104 into the rod part 116 and the cap part 120 is described with reference to FIGS. 5 and 6. The method herein described is illustrative only and other methods of fracture splitting the big end 104 into the rod part 116 and the cap part 120 are consistent with embodiments of the present invention. The connecting rod 100 is placed on top of a surface plate 143 and two sliders 144 are inserted in the crankpin hole 110 such that they are diametrically movable. A wedge 148 is disposed between the two sliders 144 such that each of the wedge faces mate with a similarly angled face on each of the two sliders 144, as best seen in FIG. 8. A force F is applied to the top of the wedge 148, which produces a separating force on the rod and cap parts 116, 120 as the wedge 148 is driven into the two sliders 144.

As the wedge 148 is driven between the sliders 144, stresses are produced along the wail of the crankpin hole 110. The brittleness of the hardened material in the thin wall region 128 between the crankpin and bolt holes 110, 112 combined with the use of the fracture starting grooves 122 produce a condition in which a relatively small amount of strain is needed to initiate a fracture at the region 128. Therefore, the smallest wall thickness W1 in the vicinity of each of the bolt holes 112 serves as the starting point of fracture separation. The application of the separating force generally along the dividing plane 118 produces a higher stress in the vicinity of the region 128 than the stress produced in the vicinity of the unhardened material (core material). Consequently the region 128 acts as a stress raiser to initiate fracture from this point on each side of the crankpin hole 110. As a result of the single fracture starting points corresponding to each of the bolt holes 112, the rod and cap parts 116, 120 have fracture surfaces 138, 140 that are normally free from double fractures. This process also involves a simpler jig, which thereby can reduce production costs in comparison to the prior fracturing methods described above.

Figure 7:
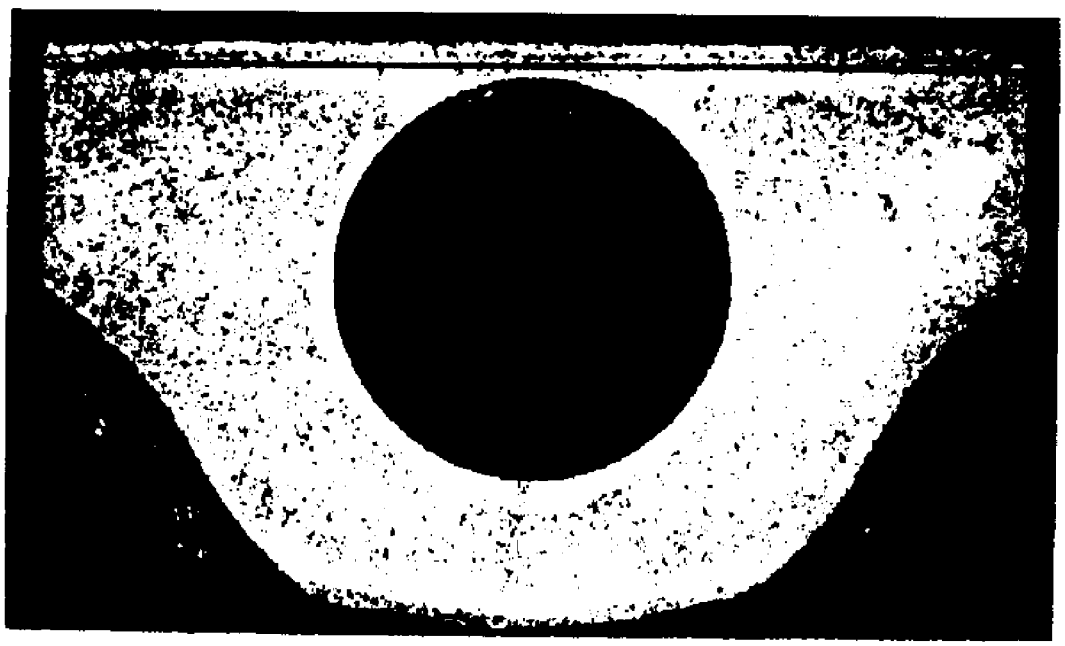
FIG. 7 is a picture of a fracture split surface of a connecting rod formed in accordance with the preferred manufacturing method.

FIG. 7 shows a fracture split surface of a connecting rod 100, produced according to the illustrated embodiment that is free of double fractures. Specifically, the connecting rod 100 was hardened to produce a smallest wall thickness W1 that is less than twice the thickness T of the hardened surface layer 126 using a carburization and quenching technique. By contrast, FIG. 8 shows a fracture split surface containing a double fractures that was produced using a conventional method of fracture splitting a connecting rod.

Figure 9:
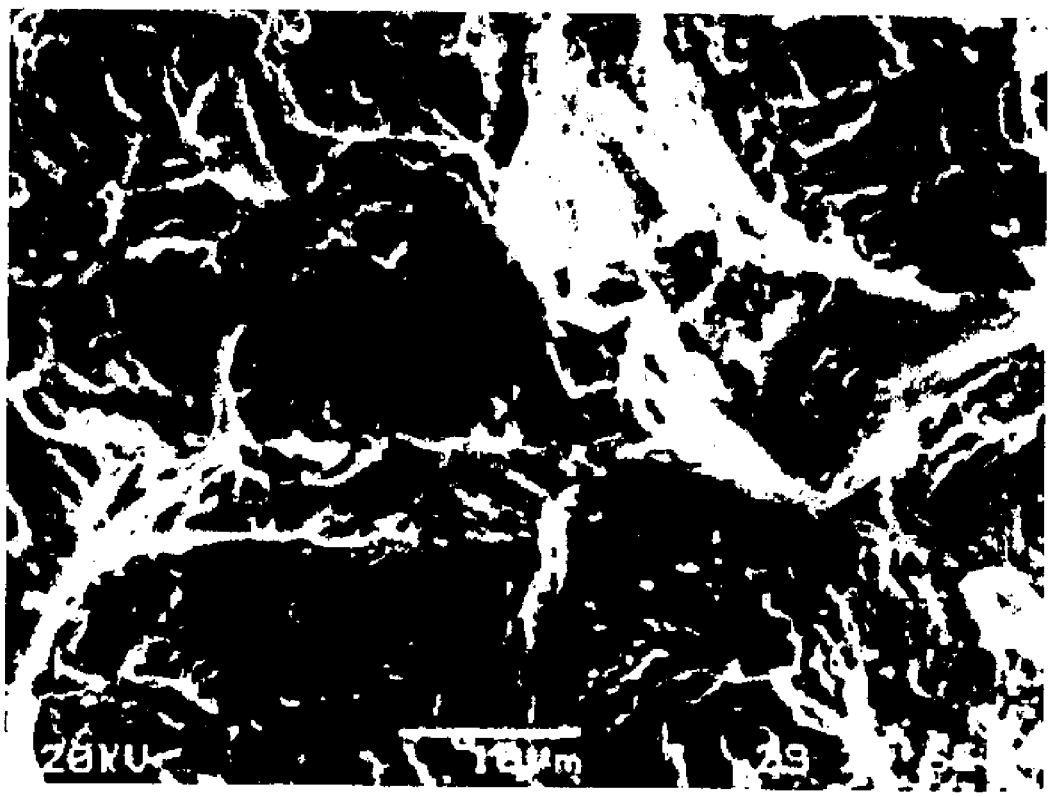
FIG. 9 is a micrograph of a grain boundary fracture surface showing a hardened portion of the fracture split surface depicted in FIG. 7.
Figure 10:
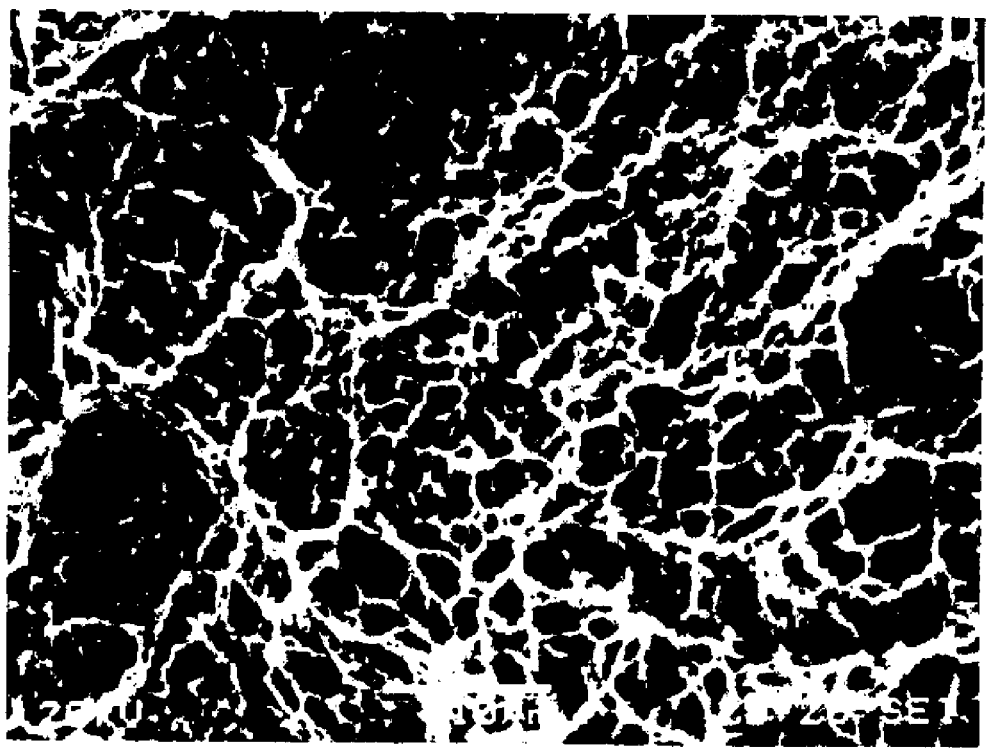
FIG. 10 is a micrograph of an elongation fracture surface showing an unhardened portion of the fracture split surface depicted in FIG. 7.

With reference to FIGS. 9 and 10, in certain embodiments, the rod part fracture surface 138 and the cap part fracture surface 140 each comprise a grain boundary fracture surface and an elongation fracture surface. The grain boundary fracture surface includes portions of the fracture surfaces 138. 140 that are generally hardened (e.g., within the hardened surface layer 126). The elongation fracture surface comprises portions of the fracture surfaces 138, 140 that are generally unhardened (e.g., within the interior portion 130 of the rod and cap parts 116, 120 prior to fracture splitting). The micrograph shown in FIGS. 9 and 10 are of a fracture split surface for a connecting rod 100 produced according to the illustrated method 20. In FIG. 9, which shows a grain boundary fracture surface comprising generally hardened material, the grains lie along the grain boundary, without elongating at right angles to the fracture surface. Such grain structure produces a fracture surface that is substantially flat.

In FIG. 10, which shows an elongation fracture surface comprising generally unhardened material, the grains are elongate and separate generally at right angles to the fracture surface, forming a large number of microscopic irregularities. These irregularities in the interior portions of the rod and cap part fracture surfaces 138, 140 allow the rod and cap parts 116, 120 to be accurately repositioned and aligned to each other when they are subsequently reconnected. In addition, these irregularities help to prevent lateral motion between the rod and cap parts 116, 120 after attachment to a crankshaft.

Figure 11:
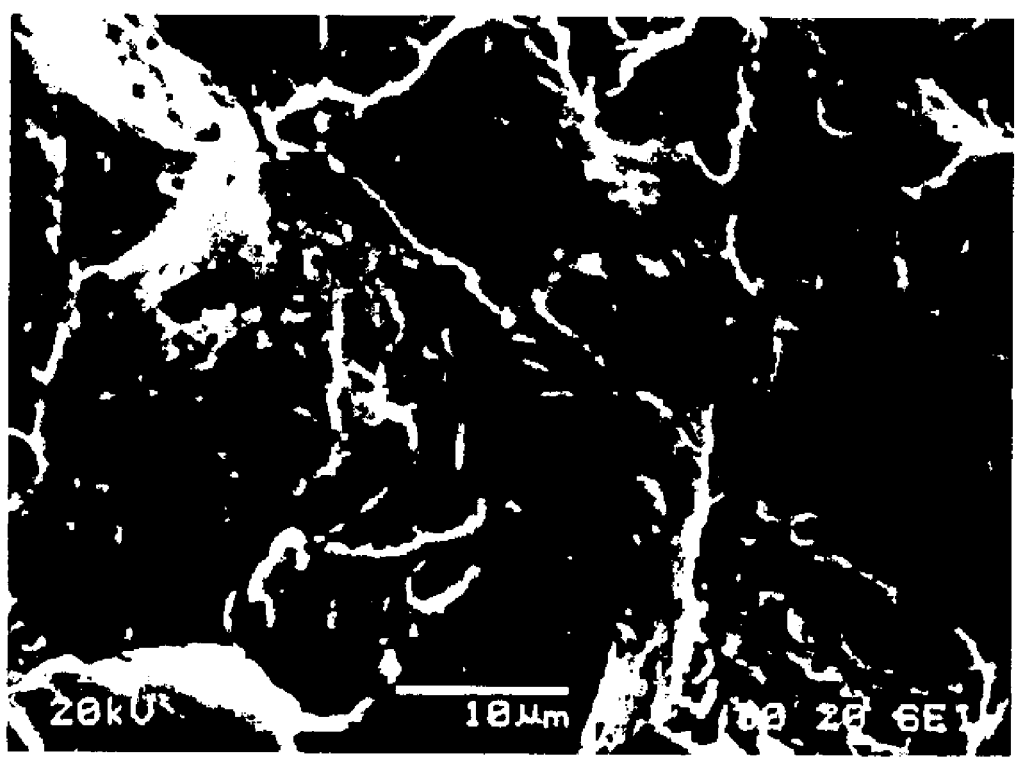
FIG. 11 is a micrograph of a conventional boundary fracture surface for a connecting rod treated by quenching.

FIG. 11 depicts a micrograph of a conventionally fabricated connecting rod that comprises a high carbon material which was heat treated by quenching. The micrograph shows a fracture split surface with microscopic fractures along the grain boundary that are substantially flat, making it difficult to obtain accurate alignment between the rod and cap parts when these parts are reassembled.

Figure 12:
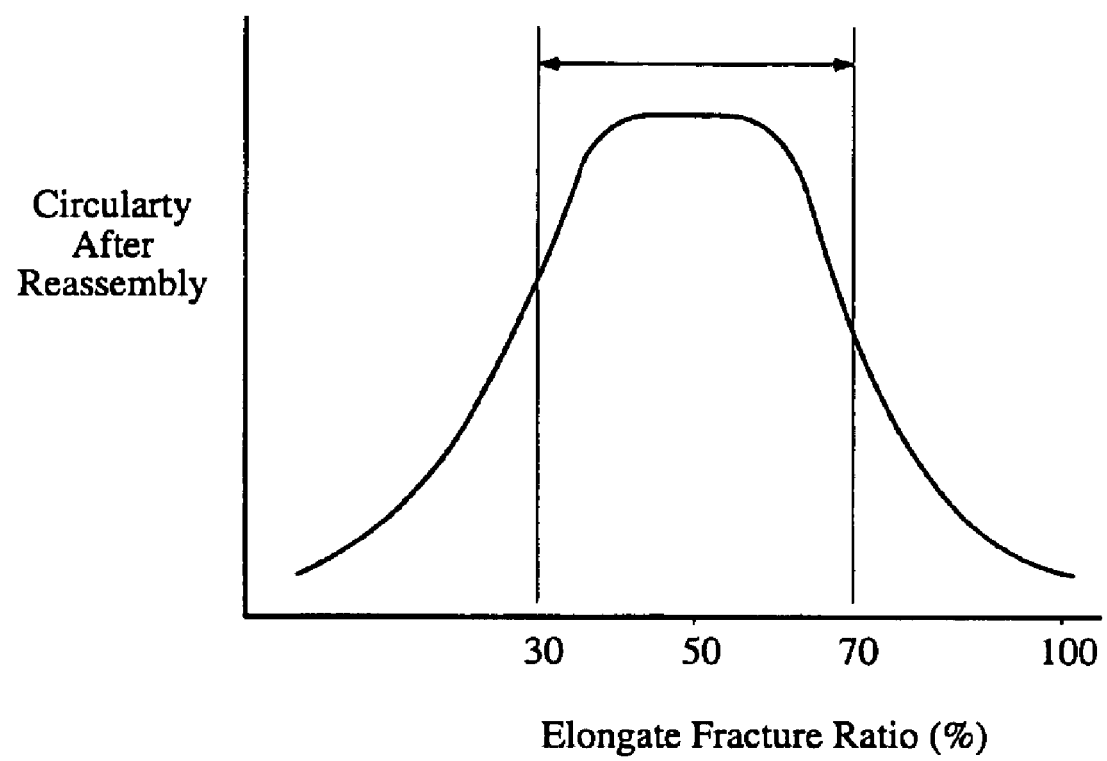
FIG. 12 is a graph showing the relationship between the circularity of the crankpin hole of the big end as a function of the area ratio of the elongation fracture split surface area divided by the total area of the fracture split surface.

The preferred mix of these two fracture surface types is achieved by controlling the depth T of the hardened surface layer 126. The depth T of the hardened surface layer 126 preferably is selected so as to produce a ratio of the elongate fracture surface area to the sum of the elongate fracture surface area and the grain boundary fracture surface area, herein referred to as the "elongation fracture ratio", that is within a predetermined range. As understood from FIG. 12, the predetermined range of the elongation fracture ratio is preferably between about 0.3 and about 0.7, more preferably is between about 0.4 and about 0.6, and most preferably about 0.5. An improved degree of circularity is obtained upon reassembly of the rod and cap parts 116, 120 when the elongation fracture ratio is within one of the preferred ranges.

In such embodiment, the surface hardening treatment is applied to the entire big end 104 without applying carbon preventing treatment, wherein it is possible to make the distribution of residual stress in the big end 104 more evenly distributed. As a result, deformation of the crankpin hole 110 on the cap part side is limited at the time of fracture separating. Therefore, circularity after reassembling is maintained and certain assembly problems can be avoided.

As a result of the illustrated manufacturing process, the rod part fracture surface 138 and the cap part fracture surface 140 exhibits both grain boundary fracture surfaces and elongation fracture surfaces. This provides several advantages over conventionally produced connecting rods including: (1) maintaining circularity of the crankpin hole 110 during reassembly, (2) reducing or eliminating double fractures, and (3) improving the positioning accuracy of the rod and cap parts 116, 120. As a result, it is possible to improve the circularity of the crankpin hole 110 upon attachment to a crankshaft, reduce wear and seizure of the big end 104, reduce the output power loss during use, and reduce the production cost in comparison with the conventional arrangements, such as using plural separation assisting holes or special jigs to prevent the occurrence of double fractures.

Figure 13:
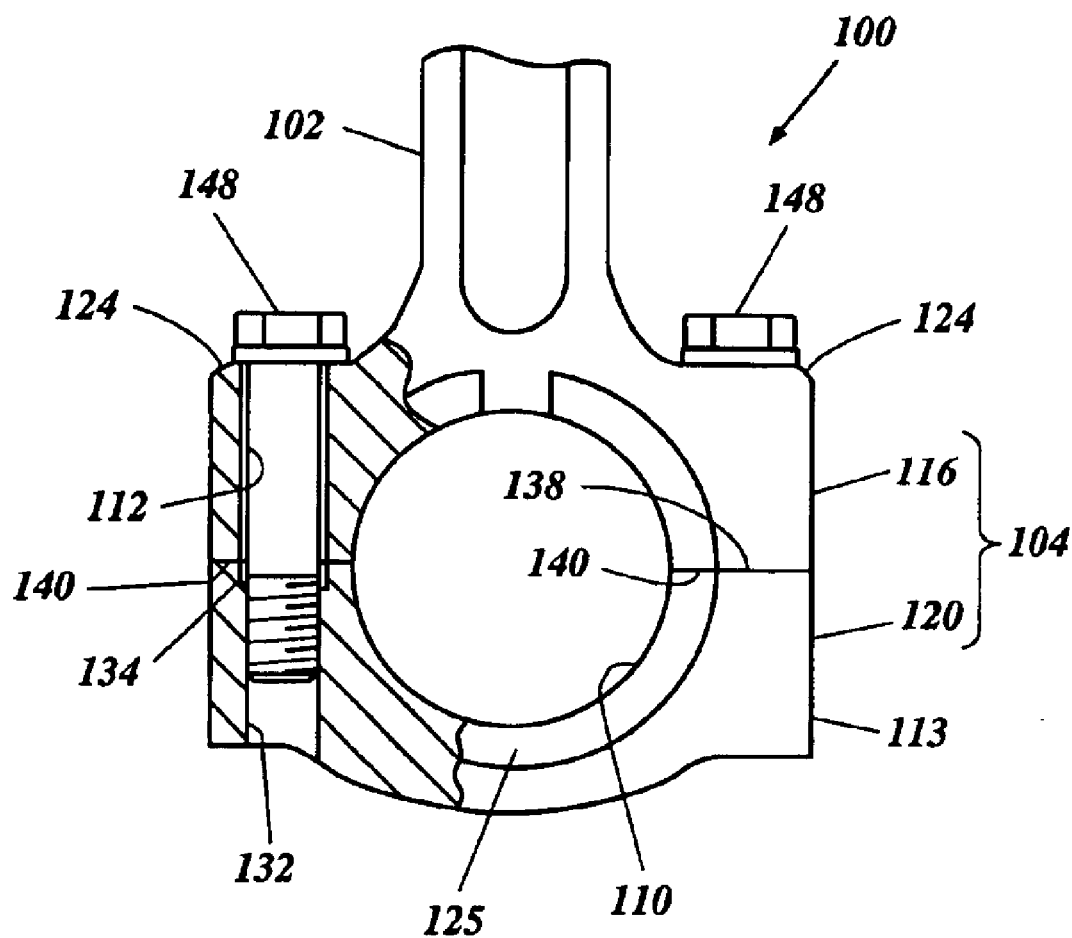
FIG. 13 is a connecting rod after assembly of the rod and cap parts in preparation for final machining.

With reference now to FIG. 13, the method 20 can further comprise the Step 38 of assembling the rod and cap parts 116, 120 of the big end 104 in preparation for final machining of the connecting rod 100 in Step 40. The rod and cap parts 116, 120 may be positioned relative to each other using their respective elongation fracture surfaces and tightened together using bolts 148 threaded into the threaded sections 132 of the bolt holes 112. As each of the bolts 148 is tightened, the elongation fracture surfaces of the rod and cap parts 116, 120 are crushed to form mating surfaces of irregular shape. During subsequent reassembly, such as when the connecting rod is attached to the crankshaft, the mating surfaces of the rod and cap parts 116, 120 register to one another, thus maintaining accurate alignment. Final machining (Step 40) is performed while the rod and cap parts 116, 120 are assembled to form the connecting rod 100.

Once fabricated, the connecting rod 100 includes the small end 108, the big end 104, and the rod 102. The big end 104 includes the rod part 116 and the cap part 120, which is separable from the rod part 116. The rod and cap parts 116, 120 have mating faces comprising an outer perimeter 152 and a void (e.g., the bolt hole 112 in the illustrated embodiment), a first surface comprising material that is hardened (e.g., the hardened surface 141), and a second surface comprising material that is generally unhardened (e.g., the unhardened surface 142). The rod and cap parts 116, 120 have mating faces and further comprise a portion between the outer perimeter and the void (e.g, the region 128 in the illustrated embodiment) that comprises hardened material.

When assembled with a crankshaft (Step 44), the rod and cap parts 116, 120 are separated by removing the bolts 148. Each part 116, 120 is placed about a crankpin of the crankshaft and aligned with each other so that the crankpin concentrically fits within the resulting crankpin hole 110. The bolts are threaded into the bolt holes 112, to reattach together the rod and cap parts 116, 120.

Figure 14:
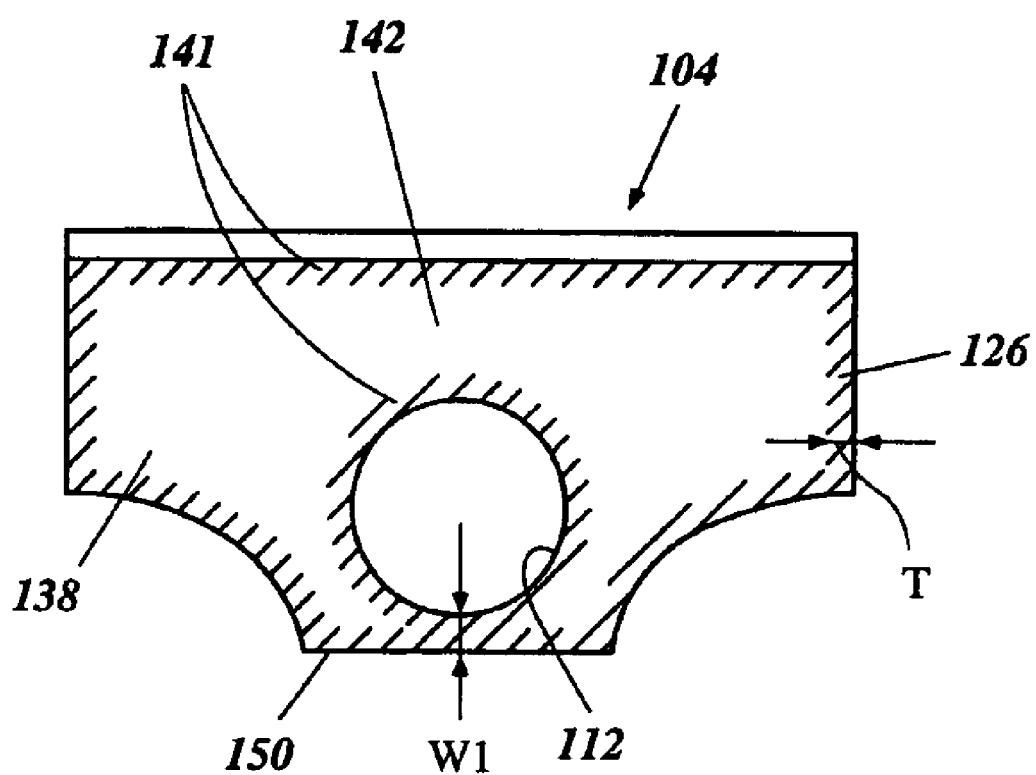
FIG. 14 is a top view of a fracture surface produced in accordance with another embodiment of the present invention.

FIG. 14 illustrates a side section of a connecting rod (similar to the side section 127 of the shoulder 124 illustrated in FIG. 4) that is configured in accordance with another preferred embodiment of the present invention. Similar reference numerals have been used between these embodiments to identify like components with the understanding that the foregoing description of such components should apply equal to the similar components in the present embodiment, unless indicated otherwise.

In this embodiment, the smallest wall thickness W1 is disposed between the bolt hole 112 and an outside end surface 150 of the big end 104. Preferably, the smallest wall thickness W1 is set to be no greater than twice the depth T of the hardened surface layer 126. Since the smallest wall thickness W1 between the bolt hole 112 and the outside end surface 150 is made no greater than twice the thickness T of the hardened surface layer 126, the material in the vicinity of the smallest wall thickness W1 is more brittle than the surrounding material and, thus, serves as the starting point of the fracture.

Figure 15:
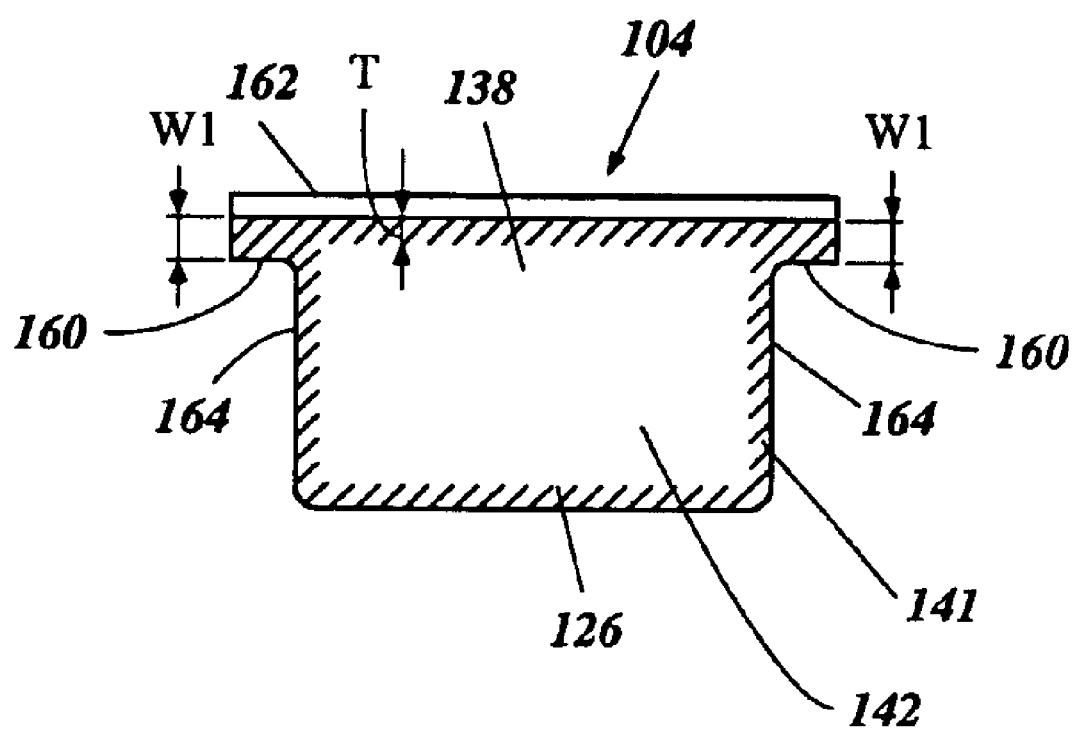
FIG. 15 is a top view of a fracture surface produced in accordance with an additional embodiment of the present invention.

FIG. 15 illustrates an additional preferred embodiment of the present invention. Again, like reference numerals have been used between the embodiments to identify similar components with the understanding that the foregoing descriptions of such components should apply equal to the similar components in the present embodiment, unless indicated otherwise.

The connecting rod blank 100a in this embodiment has a tab 160 of a predetermined thickness W1 disposed at least generally at or centered about the dividing plane 118. The method comprises hardening at least the big end 104 to a sufficient depth such that at least the tab 160 is hardened while leaving a substantial portion of the big end at the dividing plane generally unhardened. The method further comprises splitting the big end along the dividing plane to produce a rod part fracture surface and a cap part fracture surface.

In the illustrated embodiment of FIG. 15, the tab 160 is formed between the straight line 162 forming the contour of the dividing plane 118 and the right and left curved surfaces 164 opposite the straight line 162. The tab thickness W1 is set to be smaller than twice the depth T of the hardened surface layer 126. Since the tab thickness W1 is the smallest wall thickness, the tab 160 is more brittle than the surrounding material. Thus, when the big end 104 is fracture split, the tab 160 serves as the starting point of the fracture. This prevents the formation of double fractures, thus, lowering the fabrication cost, since a complex jig is not needed.

Although this invention has been disclosed in the context of certain preferred embodiments, variations and examples, it will be understood by those skilled in the art that the present invention extends beyond the specifically disclosed embodiments to other embodiments and/or uses of the invention and obvious modifications and equivalents thereof. In particular, while the present manufacturing method has been described in the context of particularly preferred embodiments, the skilled artisan will appreciate, in view of the present disclosure, that certain advantages, features and aspects of the method may be realized in a variety of other applications, and the structure of the connecting rod can have other shapes in addition to those described above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A method of forming a connecting rod, comprising:
   providing a connecting rod blank having:
   a rod section disposed between a big end and a small end; and
   the big end having a first hole generally sized to receive a crankpin of a crankshaft and at least a second hole generally sized to receive a bolt, the axes of the first and second holes being generally normal to each other, the big end also having a dividing plane that extends through both the first and second holes;

hardening at least the big end to a sufficient depth such that at least a first region of the big end, which lies between the first and second holes at the dividing plane, is hardened while leaving a second region of the big end generally unhardened, where the second region continuously surrounds the second hole except for a region around the dividing plane between the first hole and the second hole;

controlling at least a process hardening parameter so as to produce a hardened surface layer of a predetermined depth that is greater than one half of a smallest wall thickness between the walls of the first hole and the second hole; and splitting the big end along the dividing plane to produce a rod part fracture surface and a cap part fracture surface.

2. The method of claim 1, wherein controlling involves controlling temperature and exposure time so as to produce a hardened surface layer of a predetermined depth that is greater than one half of a smallest wall thickness between the walls of the first hole and the second hole.

3. A method of forming a connecting rod, comprising:

providing a connecting rod blank having:

a rod section disposed between a big end and a small end;

the big end having a first hole generally sized to receive a crankpin of a crankshaft and at least a second hole generally sized to receive a bolt, the axes of the first and second holes being generally normal to each other, the big end also having a dividing plane that extends Through both the first and second holes;

hardening at least the big end to a sufficient depth such that at least a first region of the big end, which lies between the first and second holes at the dividing plane, is hardened while leaving a second region of the big end generally unhardened, where the second region continuously surrounds the second hole except for a region around the dividing plane between the first hole and the second hole; and splitting the big end along the dividing plane to produce a rod part fracture surface and a cap part fracture surface.

4. The method of claim 3, wherein hardening comprises case hardening followed by tempering.

5. The method of claim 3, wherein hardening comprises case hardening followed by tempering without applying a carbon preventing treatment to the big end.

6. The method of claim 3, wherein hardening involves producing a higher carbon content in the first region than in the second region.

7. The method of claim 3, wherein splitting produces rod part fracture surfaces and cap part fracture surfaces, and each fracture surface comprises a grain boundary fracture surface and an elongation boundary fracture surface.

8. The method of claim 3, wherein a connecting rod blank comprising carbon steel or case hardening steel is provided.

9. The method of claim 3, wherein hardening involves controlling temperature and exposure time so as to produce a hardened surface layer of a predetermined depth that is greater than one half of a smallest wall thickness between the walls of the first hole and the second hole.

10. The method of claim 3, wherein hardening involves controlling at least a process hardening parameter so as to produce a hardened surface layer of a predetermined depth that is greater than one half of a smallest wall thickness between the walls of the first hole and the second hole.

11. A method of forming a connecting rod, comprising:

providing a connecting rod blank having a rod section disposed between a big end and a small end, the big end having a dividing plane that generally bisects the big end;

hardening at least the big end to a predetermined depth; and splitting the big end along the dividing plane to produce a grain boundary fracture surface and an longate fracture surface;

wherein the predetermined depth of hardening is selected so as to produce a ratio of the elongate fracture surface area to the sum of the elongate fracture surface area and the grain boundary fracture surface area that is between about 0.3 and about 0.7.

12. The method of claim 11, wherein the predetermined depth of hardening is selected so as to produce a ratio of the elongate fracture surface area to the sum of the elongate fracture surface area and the grain boundary fracture surface area that is between about 0.4 and about 0.6.

13. The method of claim 11, wherein the predetermined depth of hardening is selected so as to produce a ratio of the elongate fracture surface area to the sum of the elongate fracture surface area and the grain boundary fracture surface area that is about 0.5.

14. A connecting rod, comprising:

a small end;

a big end including a rod part and a cap part separable from the rod part, the rod and cap parts having mating faces; and a rod connecting the rod part of the big end to the small end; wherein each of the mating faces includes:

an outer perimeter and a void; and a first surface portion comprising material that is hardened and a second surface portion comprising material that is generally unhardened, where the first surface portion at least extends between the void and a portion of the outer perimeter, and where the second surface portion continuously and substantially extends around the void.

15. The connecting rod of claim 14, wherein the first surface comprises a grain boundary fracture surface and the second surface comprises an longate fracture surface.

16. The connecting rod of claim 15, wherein the ratio of the elongate fracture surface area to the sum of the elongate fracture surface area and the grain boundary fracture surface area is between about 0.3 and about 0.7.

17. The connecting rod of claim 15, wherein the ratio of the elongate fracture surface area to the sum of the elongate fracture surface area and the grain boundary fracture surface area is between about 0.4 and about 0.6.

18. The connecting rod of claim 15, wherein the ratio of the elongate fracture surface area to the sum of the elongate fracture surface area and the grain boundary fracture surface area is about 0.5.

19. The connecting rod of claim 14, wherein the first surface has a higher carbon content than the second surface.

20. The connecting rod of claim 14, wherein the connecting rod comprises carbon steel or case hardening steel.

21. The connecting rod of claim 14, further comprising a hardened surface layer of a generally constant depth that is no greater than one half of a smallest wall thickness between the walls of the outer perimeter and the void.

22. A connecting rod, comprising:

a small end;

a big end including a rod part and a cap part separable from the rod part, the rod and cap parts having mating faces; and a rod connecting the rod part of the big end to the small end; wherein each of the mating faces has a grain boundary fracture surface and an elongate fracture surface, wherein a ratio of the elongate fracture surface area to the sum of the elongate fracture surface area and the grain boundary fracture surface area is between about 0.3 and about 0.7.

* * * * *